US007054043B2

(12) United States Patent
Mengel et al.

(10) Patent No.: US 7,054,043 B2
(45) Date of Patent: May 30, 2006

(54) SECURITY ELEMENT

(75) Inventors: Christoph Mengel, Holzkirchen (DE); Desanka Gacesa, Miesbach (DE); Max Voit, Weilheim (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/528,425

(22) PCT Filed: Sep. 18, 2003

(86) PCT No.: PCT/EP03/10426

§ 371 (c)(1),
(2), (4) Date: Mar. 18, 2005

(87) PCT Pub. No.: WO2004/028824

PCT Pub. Date: Apr. 8, 2004

(65) Prior Publication Data

US 2006/0023132 A1 Feb. 2, 2006

(30) Foreign Application Priority Data

Sep. 19, 2002 (DE) ................................ 102 43 650

(51) Int. Cl.
*G03H 1/00* (2006.01)

(52) U.S. Cl. .............................. 359/2; 359/7; 359/900; 283/94

(58) Field of Classification Search .................... 359/2, 359/3, 4, 5, 7, 900; 283/94, 95
See application file for complete search history.

(56) References Cited

U.S. PATENT DOCUMENTS

| | | | | |
|---|---|---|---|---|
| 3,733,485 | A * | 5/1973 | Gaynor et al. | 250/331 |
| 2003/0052305 | A1* | 3/2003 | Coates et al. | 252/299.64 |

FOREIGN PATENT DOCUMENTS

| | | | | |
|---|---|---|---|---|
| DE | 100 23 004 A1 | 11/2001 | | |
| EP | 0 435 029 A2 | 7/1991 | | |
| EP | 0 608 078 A1 | 7/1994 | | |
| EP | 0 899 119 A1 | 3/1999 | | |
| FR | 2871174 | * 12/2005 | | 359/900 |
| JP | 2-252590 | * 10/1990 | | 283/94 |
| WO | WO 00/50249 A | 8/2000 | | |
| WO | WO 00/54985 A1 | 9/2000 | | |
| WO | WO 01/16426 A | 3/2001 | | |

* cited by examiner

*Primary Examiner*—Fayez G. Assaf
(74) *Attorney, Agent, or Firm*—Rothwell, Figg, Ernst & Manbeck

(57) ABSTRACT

The invention relates to an object of value with a security element having at least a first and a second liquid-crystalline material, the first material having thermochromic properties and the second material an optically variable effect.

31 Claims, 3 Drawing Sheets

SECURITY ELEMENT

CROSS-REFERENCE TO RELATED APPLICATION

This application is a National Phase of International Application Serial No. PCT/EP03/10426, filed Sep. 18, 2003.

FIELD OF THE INVENTION

This invention relates to a security element for protecting objects of value that has at least a first and a second liquid-crystalline material, the first material having thermochromic properties and the second material an optically variable effect. Further, the invention relates to an object of value, a transfer material and methods for producing such security elements and objects of value and a method for checking such a security element or object of value.

DESCRIPTION OF THE BACKGROUND ART

An object of value according to the invention may be any object to be protected, for example proprietary articles or documents of value. Objects of value according to the present invention are in particular bank notes, but also shares, certificates, postage stamps, checks, check cards, credit cards, ID cards, passports, admission tickets, travel tickets, plane tickets and the like, as well as labels, seals, packages or other elements for product protection. The simplifying designation "object of value" or "security element" will therefore hereinafter always include documents of the stated kind.

It has been known for some time to use thermochromic materials for protecting documents of value. For example, DE 22 12 350 describes a security thread of transparent plastic that has cavities. Said cavities contains a liquid-crystalline material that shows a reversible color change upon an increase or decrease in temperature.

EP 0 608 078 B1 likewise discloses a security thread with thermochromic properties. In this case, a plastic material is provided with a print or with characters resulting from partially demetalizing a metal layer. Disposed above said print or negative characters is a thermochromic coating that is colored at normal temperature. When heated, the thermochromic coating turns colorless so that the characters therebelow become recognizable. Alternatively, one can also use a thermochromic coating that is colorless at normal temperature and turns colored when heated so that the characters disappear. This thread is incorporated into the security paper so as to pass directly to the surface in certain areas, so-called "windows."

Such thermochromic security threads have the disadvantage, however, that the thermochromic effect is used for purely decorative purposes in many areas not involving security, so that the optical effect produced by the color change of the thermochromic material is not recognized by the viewer as a security feature but merely as a design variant. Such security elements thus do not offer high protection from forgery.

SUMMARY OF THE INVENTION

The invention is therefore based on the problem of providing an object of value, a transfer element and a security element that offer high protection from forgery and avoid the disadvantages of the prior art.

Further, it is the problem of the invention to provide methods for producing such a security element and object of value and a method for checking the security element or object of value.

These problems are solved by the features disclosed herein.

According to the invention, the security element has at least a first and a second liquid-crystalline material, the first material having thermochromic properties and the second material an optically variable effect.

The first liquid-crystalline material has thermochromic properties, i.e. its inherent color changes under the influence of temperature. Preferably, the thermochromic material additionally shows polarization effects, i.e. it is capable of polarizing light selectively. These substances are preferably encapsulated liquid crystals that are crystalline and do not polarize at a certain temperature, but change their color and additionally polarize upon a change of temperature, in particular increase of temperature, and a change to the liquid-crystalline state. Depending on the thermochromic material used, the material can pass from the liquid-crystalline state to the liquid state upon a further increase in temperature, whereby in the liquid state the thermochromic material is again transparent or at least translucent and does not polarize.

The second liquid-crystalline material has an optically variable effect. "Optically variable effect" refers according to the invention to the effect that different color effects are conveyed at different viewing angles. It is also known as the so-called "color shift effect." Green-blue or copper-green color transitions have proved especially suitable. Preferably, said second material also shows light-polarizing properties. In particular, crosslinked liquid-crystalline materials show light-polarizing properties with the simultaneous presence of a color shift effect without having thermochromic effects.

In an especially preferred variant, the thermochromic liquid-crystalline material and the liquid-crystalline material with an optically variable effect polarize light differently, e.g. one material can selectively polarize right-handed circularly and the other material can selectively polarize left-handed circularly.

Preferably, the liquid-crystalline materials are processed in the form of printing inks by being added to a transparent binder for example. The ink can of course contain further coloring pigments. The liquid-crystalline materials can be processed with any suitable printing process, in particular by screen printing and intaglio printing, but also by halftone gravure, flexography and letterpress.

The materials can be added not only to inks but also to a transparent plastic layer.

For the inventive liquid-crystalline materials there are numerous possibilities of variation within the scope of the invention. Thus, the thermochromic material can be provided all over or preferably only in certain areas, in particular in the form of characters or patterns.

The liquid-crystalline material with an optically variable effect can, like the thermochromic material, be processed all over or in certain areas, the form of application determining whether all-over or areal processing is preferred.

The thermochromic material can be disposed above and/or below and/or beside the material with an optically variable effect. Especially suitable effects result if the different liquid-crystalline materials overlap at least partly. An overlap of the effects moreover has the advantage that the viewer can detect them more easily on the object to be protected and simultaneously check them in suitable embodiments. The effects can be made visible with great ease in particular if polarization filters are used, by placing the filter on a certain place on the object.

Substances are preferably used for the thermochromic material that are at least translucent, preferably transparent, below a predetermined temperature and colored above said temperature. In certain applications it can be expedient to use thermochromic substances that are colored below a predetermined temperature and translucent or transparent above said temperature. The color change temperature of the thermochromic substances is preferably above ambient temperature, e.g. in the range of 25° C. to 60° C., preferably 30° C. to 60° C. Depending on the application, however, color change temperatures of under 25° C. are also conceivable.

The individual layers of the security element can be either produced directly on the object of value or prepared on a separate carrier. The object of value or separate carrier as a substrate carrying the security element is in no way restricted in terms of the material used. However, it preferably consists of paper or plastic, also in the form of foils. In case of a separate carrier, the security element can be formed for example as a self-supporting label, preferably on a plastic substrate. Since it can in some cases cause difficulties to provide the object of value directly with the particular layer sequence, it may alternatively be expedient to prepare the layer structure of the security element at least partly on a transfer material.

If the total layer sequence of the security element is prepared on a transfer material, it is to be heeded that the layer structure shown in the particular figures must be prepared on the carrier band of the transfer material in the reverse order. The layer structure of the security element can be prepared on the carrier band in endless form. Application of the security element to an object of value to be protected is effected with the aid of an adhesive layer that is applied either to the object of value or to the uppermost layer of the transfer material. Preferably, a hot-melt adhesive is used here. To define the outline form of the security element, an adhesive layer can be provided either only in the areas to be transferred, or the adhesive, for example a hot-melt adhesive, is activated only in the areas to be transferred. After transfer, the carrier band of the transfer material is removed and only the shown layer structure of the security element remains on the object of value to be protected.

The object of value to which the security element is applied may be for example a security paper, a security document, or else a product package. Other objects of value that require security-type protection can of course also be provided with the inventive security element.

The security element is preferably disposed completely on the surface of the object to be protected. If the security element is disposed completely on the surface of the object, it can be executed over a substantially greater area, so that the optically variable effect and the thermally induced color change of the different liquid-crystalline materials are substantially more striking due to the greater area. The application of a polarization filter is also much easier if a greater observation area is available.

The use of differently polarizing liquid-crystalline materials additionally gives the security element greater protection from forgery, because such materials are either elaborate to produce or cannot readily be procured on the market.

The present invention thus offers additional protection from forgery by combining the thermochromic effect visually perceptible without aids and the optically variable effect visually perceptible without aids. In particular, the protection from forgery is further increased by additional use of the polarization effect visually perceptible only with aids. Besides the easily recognizable optically variable effect, information can additionally be easily hidden or made visible by the thermochromic effect, e.g. the viewer can expose the information merely by touch. The authenticity of the information can further be checked in a next step, e.g. by means of a polarization filter, if at least one of the liquid-crystalline materials polarizes light.

Further advantages and embodiments of the invention will be explained in more detail with reference to the figures. The proportions shown in the figures do not necessarily correspond to the relations present in reality and serve primarily to improve clarity.

The invention will be explained for clarity's sake by the example of a bank note.

DETAILED DESCRIPTION OF THE INVENTION

Figure 1:
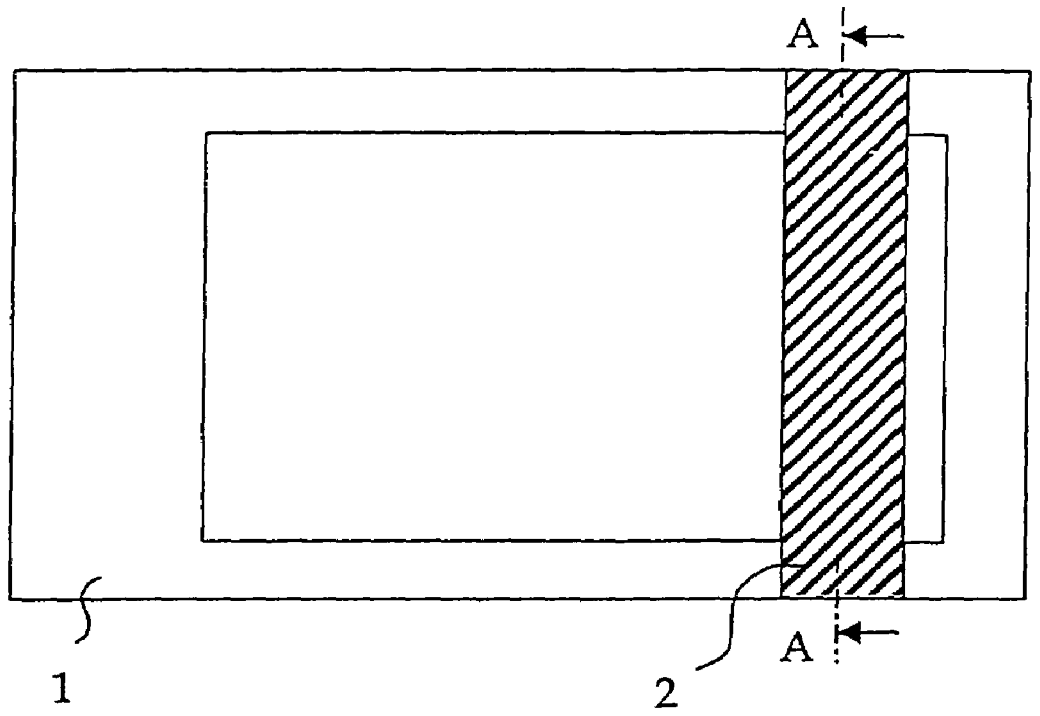
FIG. 1 shows a security document with an inventive security element.

FIG. 1 shows such a bank note 1 of paper or plastic that is provided with security element 2 in the form of a strip extending across the total width of the bank note. Bank note 1 can of course have further security features, such as watermarks, steel intaglio, security threads or luminescent or magnetic prints or the like.

Security element 2 has a thermochromic liquid-crystalline layer combined with a liquid-crystalline color shift effect layer. Security element 2 is disposed completely on the surface of bank note 1, so that the thermally induced color change of the thermochromic layer preferably applied in patterns and/or characters is very well recognizable.

Besides the thermochromic layer and color shift effect layer, security element 2 can have further layers that produce further striking optical effects alone or in combination with other layers of the security element. Some preferred embodiments will be explained with reference to FIGS. 2 to 6 that show bank note 1 in a top view and cross section along dash-dotted line A—A to illustrate the layer structure of security element 2.

Figure 2:
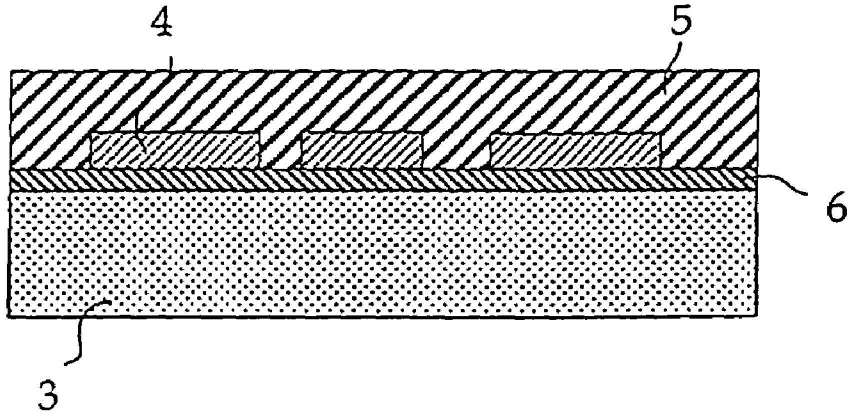
FIGS. 2, 5, 6 show different embodiments of the security document in cross section.

According to FIG. 2, paper or plastic substrate 3 of bank note 1, which has a white or light inherent color, is provided with liquid-crystalline thermochromic print 4 in the form of characters or patterns. Disposed above thermochromic layer 4 all over is liquid-crystalline color shift effect layer 5, which produces different color effects in reflected light upon a change of viewing angle independently of temperature. This effect is called an "optically variable" effect. Layers 4 and 5 may involve for example a printing ink consisting of a transparent binder with liquid crystal pigments mixed therein.

Since said pigments are transparent and have no or little body color of their own, the visually recognizable optical impression of said pigments is determined very greatly by the background. On a diffusely reflective white or light background the pigments hardly appear, since the diffusely reflected scattered light superimposes the optically variable effect. On a dark background, however, the interplay of colors of said pigments is especially effective since the background absorbs the transmitted radiation. According to the invention, the dark, preferably black, background can be designed all over or in structured form. Thus, the background can be designed e.g. in the form of patterns and/or characters, such as guilloches, negative guilloches or other finely structured patterns. Information can likewise be worked into the security element by means of alphanumeric characters or bar codes. The background is preferably designed so that the predominant share of the area in question is dark or black.

Figure 3:
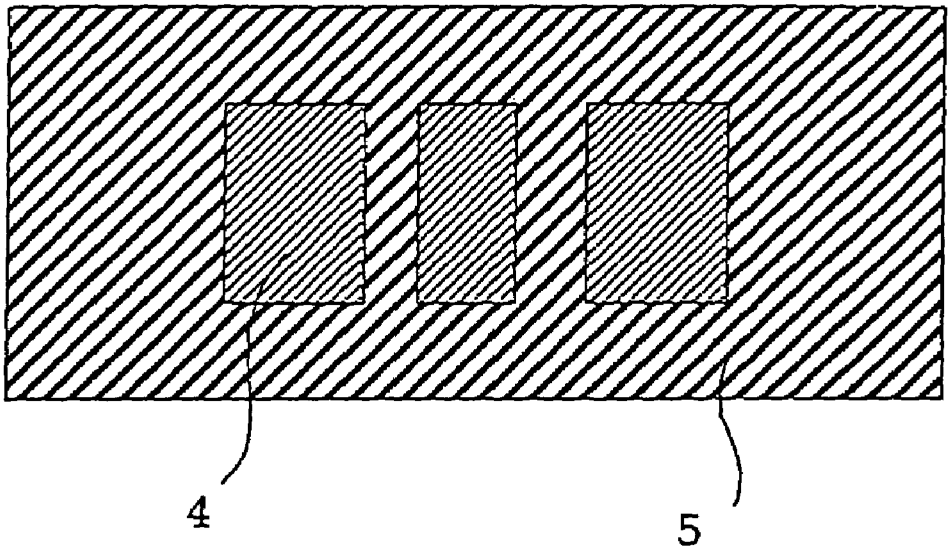
FIGS. 3, 4 show the embodiment according to FIG. 2 in a top view.
Figure 4:
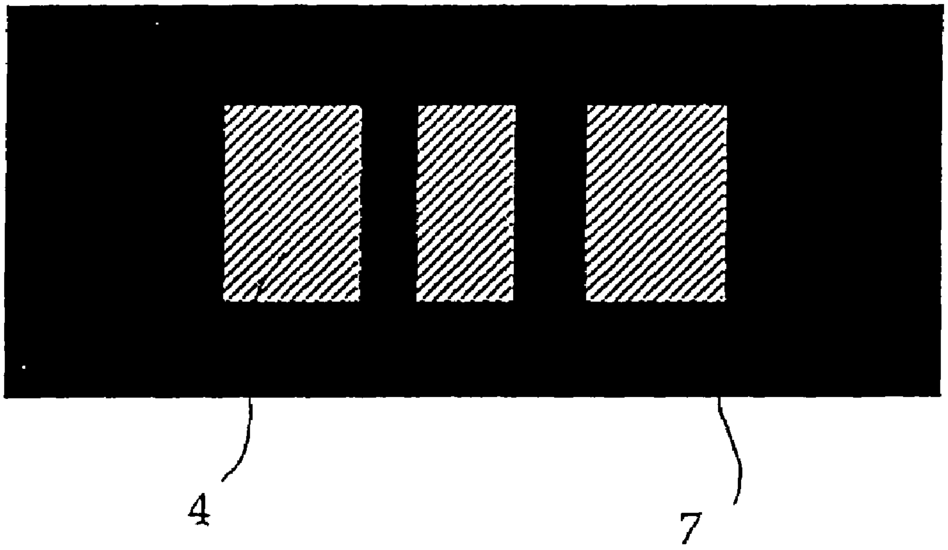

Due to the transparency of the liquid crystal pigments, substrate 3 preferably has at least in partial areas of liquid-crystalline materials 4, 5 a dark, in particular black, inherent color or—as shown here—further dark, preferably black, layer 6, which can be e.g. printed on. In the case of a dark background, the optically variable effect produced by color shift effect layer 5 is particularly evident. In the variant shown in FIG. 2, at least the area equipped with liquid-crystalline material is underlaid all over with a black layer. For layer 4 a thermochromic material is preferably used that is transparent at normal ambient temperature. Above the color change temperature of thermochromic layer 4, the latter preferably turns colored, in particular light, so that the characters represented by thermochromic layer 4 become visible and the color shift effect is virtually no longer perceptible in the area of the characters. The viewer is thus presented with the following picture. Below the color change temperature, he perceives only the color shift effect of non-thermochromic material 5 with the naked eye. By supplying body heat while touching or rubbing the surface, he can additionally read thermochromic information 4, here the rectangles, above the color change temperature, as shown in FIG. 3. With the naked eye the viewer can thus already check two security features. In a preferred embodiment, at least one of the liquid-crystalline materials used is a polarizing substance. Particularly preferably, both thermochromic material 4 and material with a color shift effect 5 have polarizing properties. The thermochromic material processed in FIG. 2 polarizes light preferably right-handed circularly above the color change temperature, i.e. in the liquid-crystalline state, while the material with a color shift effect polarizes left-handed circularly. Upon viewing with a polarization filter that passes only right-handed circularly polarized light, only information 4 can therefore be read above the color change temperature, while the area of the color-shift material appears black 7. This situation is shown in FIG. 4. Upon viewing with a polarization filter that passes only left-handed circularly polarized light, only area 5 with a color shift effect can be perceived.

Alternatively, a thermochromic material can be used that is light or colored at normal ambient temperature and turns transparent only above a certain activation temperature. In this case, previously present information disappears by the action of heat.

Figure 5:
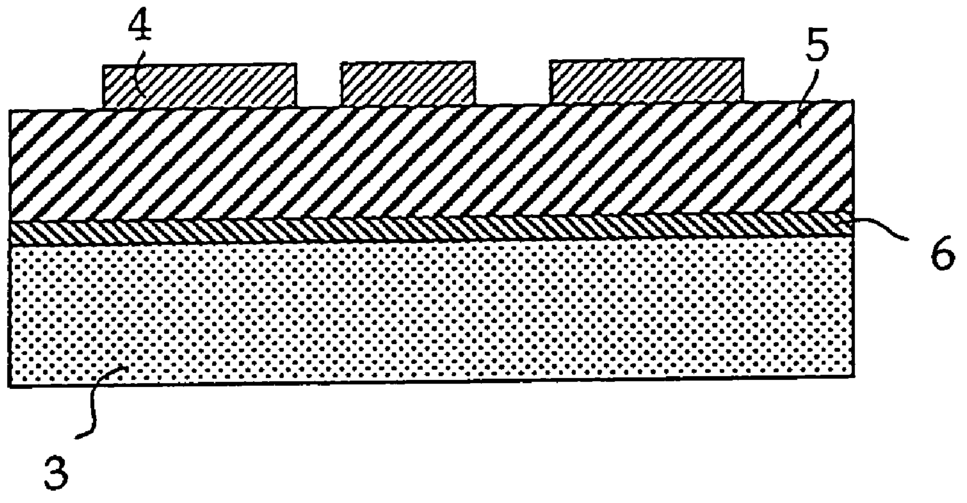

As shown in FIG. 5, liquid-crystalline color shift effect layer 5 can first be applied to black coated substrate 3 and only then thermochromic liquid-crystalline layer 4, in contrast to the layer sequence shown in FIG. 2. Which layer sequence is preferred depends on the application or the possibilities of production and can be decided depending on the individual case. If the thermochromic layer is located between substrate and color shift effect layer, the thermochromic effect lasts longer in some embodiments since the color shift effect layer could serve as a kind of heat insulator. This greatly depends on several other factors, however, such as supplied heat, processed layer thickness, etc. The effects to be observed with respect to color shift effect, thermochromic information and polarization are comparable to those from FIG. 2.

Figure 6:
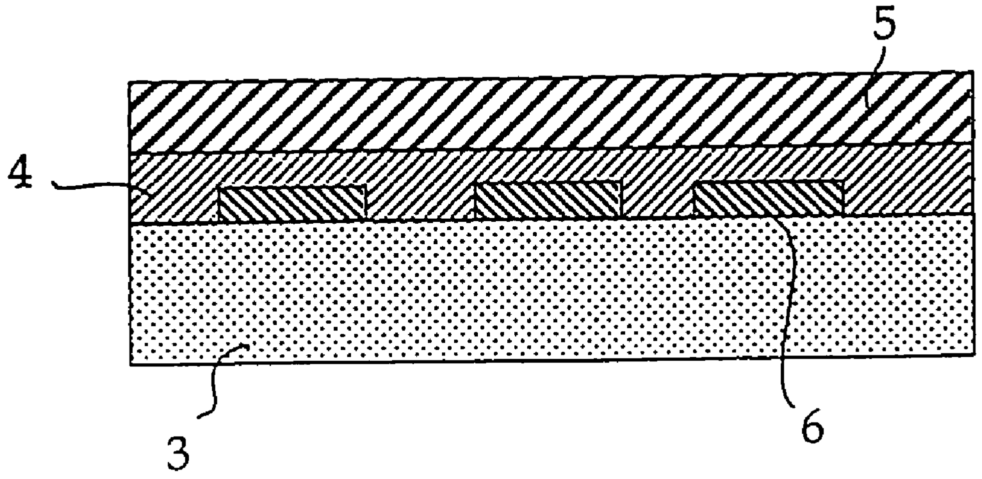

FIG. 6 shows a layer structure in which substrate 3 is provided in a first step with dark, preferably black, print 6 in the form of patterns and/or characters. In FIGS. 2 and 5 an all-over black layer was used. Applied above print 6 is all-over layer 4 of thermochromic material, followed by color shift effect layer 5. If a material that is transparent at ambient temperature is used for thermochromic layer 4, optically variable layer 5 appears as a brilliant layer with an interplay of colors in the areas of the dark or black print and is hardly perceptible in the areas of the light substrate. Above the color change temperature of the thermochromic material, layer 4 turns colored and can be recognized well in the area of marking 6 therebelow. The color shift effect is no longer visible with the naked eye. If the thermochromic material has right-handed circularly polarizing properties, this can be recognized in the area of black print 6 above the color change temperature with the help of a corresponding polarization filter. If the color shift effect material has left-handed circularly polarizing properties, this can likewise be measured in the area of black print 6 with the help of a corresponding polarization filter independently of temperature.

Protection from forgery is in particular increased if polarization effects are additionally used besides the thermal effect and color shift effect. In the embodiments shown in the figures, but of course not restricted thereto, the liquid-crystalline thermochromic material can e.g. polarize light right-handed circularly while the liquid-crystalline material with a color shift effect polarizes light left-handed circularly.

Likewise, it is possible for the liquid-crystalline layers and/or at least one of the further layers to have further properties that are testable visually and/or by machine, such as electric conductivity, magnetism, luminescence or the like. To give the particular print electrically conductive properties, it suffices for example to add a sufficient quantity of carbon black pigments to the printing inks used. Since in particular the background is to have a dark, preferably black, inherent color, it can be equipped with magnetic properties in a very simple way by using dark magnetic pigments instead of coloring pigments.

In certain embodiments, e.g. security elements that are exposed to high mechanical or chemical load during use, it is expedient to cover the liquid-crystalline materials with a protective layer. The protective layer can be a foil laminated over the security element, or a protective lacquer layer. The protective lacquer layer can be applied all over or in partial areas. If thermochromic material and material with an optically variable effect are disposed side by side, the partial areas can also be disposed only above one, e.g. the thermochromic, material. For the lacquer system one can use e.g. UV lacquers, hybrid lacquers, oleographic lacquers or dispersion lacquers of the one- or two-component type. The protective lacquer layer is preferably printed on, e.g. by flexography or offset printing.

The thermochromic layer can also have a plurality of thermochromic materials with different color change temperatures. It is likewise possible to compose the thermochromic layer of a plurality of color layers containing different thermochromic materials with different color change temperatures. In an especially attractive embodiment, the thermochromic material shows rainbow colors, i.e. a color change from colorless through red, yellow, green to blue, upon an increase in temperature.

Likewise, different liquid-crystalline materials can be combined with different color shift effects.

The invention claimed is:

1. An object of value with a security element, the security element having at least a first and a second liquid-crystalline material, the first material having thermochromic properties and the second material an optically variable effect, characterized in that the first material is crystalline and does not polarize at a first temperature, and changes its color and polarizes upon a change of temperature and change to the liquid-crystalline state.

2. An object of value according to claim 1, characterized in that at least one of the liquid-crystalline materials polarizes light selectively.

3. An object of value according to claim 1, characterized in that the first and second materials polarize light differently.

4. An object of value according to claim 1, characterized in that the first material polarizes light right-handed and the second material polarizes light left-handed or vice versa.

5. An object of value according to claim 1, characterized in that the optically variable effect is a color shift effect.

6. An object of value according to claim 1, characterized in that the thermochromic material is applied all over.

7. An object of value according to claim 1, characterized in that the thermochromic material is provided only in certain areas.

8. An object of value according to claim 7, characterized in that the thermochromic material is provided in a form at least one of characters or patterns.

9. An object of value according to claim 1, characterized in that the thermochromic material is disposed above or below the material with an optically variable effect.

10. An object of value according to claim 1, characterized in that the thermochromic material is disposed beside the material with an optically variable effect.

11. An object of value according to claim 1, characterized in that an at least partly dark, background is present below the liquid-crystalline materials.

12. An object of value according to claim 11, characterized in that the background is dark all over.

13. An object of value according to claim 11, characterized in that the background is present in a form of at least one of patterns or characters.

14. An object of value according to claim 11, characterized in that the background is printed, produced by coloring a substrate or by laser.

15. An object of value according to claim 1, characterized in that at least one of one of the materials, the background or a further layer has properties that are testable by at least one of visually or by machine.

16. An object of value according to claim 1, characterized in that the thermochromic material is colored below a predetermined temperature and transparent or at least translucent above said temperature.

17. An object of value according to claim 1, characterized in that the thermochromic layer is at least translucent or transparent below a predetermined temperature and colored above said temperature.

18. An object of value according to claim 1, characterized in that the security element is a label.

19. An object of value according to claim 1, characterized in that the object of value is a security paper, a security document or a product package.

20. An object of value according to claim 1, characterized in that at least part of the security element is covered with a protective layer.

21. A security element for protecting objects of value, the security element having at least a first and a second liquid-crystalline material, the first material having thermochromic properties and the second material an optically variable effect, characterized in that the first material is crystalline and does not polarize at a first temperature, and changes its color and polarizes upon a change of temperature and change to the liquid-crystalline state.

22. A security element according to claim 21, characterized in that the first and second materials polarize light differently.

23. A security element according to claim 21, characterized in that the optically variable effect is a color shift effect.

24. A security element according to claim 21, characterized in that the thermochromic layer is transparent or at least translucent below a predetermined temperature and colored above said temperature.

25. A security element according to claim 21, characterized in that the security element is a security thread.

26. A transfer material for producing a security element, the transfer material having a carrier material on which at least a first and a second liquid-crystalline material are disposed, the first material having thermochromic properties and the second material an optically variable effect, characterized in that the first material is crystalline and does not polarize at a first temperature, and changes its color and polarizes upon a change of temperature and change to the liquid-crystalline state.

27. A transfer material according to claim 26, characterized in that the transfer material is formed as a hot stamping foil.

28. A method for producing an object of value or security element, whereby a substrate is provided, thermochromic liquid-crystalline material and liquid-crystalline material with an optically variable effect are applied to said substrate, characterized in that the first material selected is a material that is crystalline and does not polarize at a first temperature, and changes its color and polarizes upon a change of temperature and change to the liquid-crystalline state.

29. A method according to claim 28, characterized in that a) the substrate has an at least partly black layer or surface, b) the thermochromic material is applied thereabove in the form of at least one characters or patterns, and c) the liquid-crystalline material with an optically variable effect is applied thereabove; or d) the substrate has an at least partly black layer or surface, e) the liquid-crystalline material with an optically variable effect is applied thereabove, and f) the thermochromic material is applied thereabove in the form of at least one of characters or patterns.

30. A method for testing an object of value, comprising the step of checking whether a color shift effect is present, and whether upon a change of temperature both a thermochromic effect and a polarization effect not existing before the change of temperature are present.

31. The object of value of claim 11 wherein said background is black.

* * * * *